United States Patent
Hirasawa et al.

(10) Patent No.: US 11,370,451 B2
(45) Date of Patent: Jun. 28, 2022

(54) INFORMATION PROVIDING SYSTEM AND INFORMATION PROVIDING METHOD

(71) Applicant: Toyota Jidosha Kabushiki Kaisha, Toyota Aichi-ken (JP)

(72) Inventors: Takahiko Hirasawa, Toyota (JP); Kenji Uchida, Nagoya (JP); Tomoko Oba, Nagoya (JP); Takaharu Hori, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/783,667

(22) Filed: Feb. 6, 2020

(65) Prior Publication Data

US 2020/0255024 A1 Aug. 13, 2020

(30) Foreign Application Priority Data

Feb. 13, 2019 (JP) .............................. JP2019-023163

(51) Int. Cl.
*B60W 50/14* (2020.01)

(52) U.S. Cl.
CPC ....... *B60W 50/14* (2013.01); *B60W 2050/146* (2013.01)

(58) Field of Classification Search
CPC combination set(s) only.
See application file for complete search history.

(56) References Cited

U.S. PATENT DOCUMENTS

| | | | |
|---|---|---|---|
| 10,621,851 B1* | 4/2020 | Chen | B01D 53/0415 |
| 2016/0356594 A1* | 12/2016 | Sorenson | G01S 17/10 |
| 2018/0096606 A1* | 4/2018 | Moreira-Matias | G08G 1/202 |
| 2018/0111552 A1* | 4/2018 | Neiswander | B60Q 9/008 |

FOREIGN PATENT DOCUMENTS

JP 2004-014403 A 1/2004

OTHER PUBLICATIONS

Infoplease staff, "Air Pressure and Humidity," Feb. 11, 2017; Infoplease.com; p. 2 (https://www.infoplease.com/math-science/weather/air-pressure-and-humidity) (Year: 2017).*

* cited by examiner

*Primary Examiner* — Nabil H Syed
*Assistant Examiner* — Cal J Eustaquio
(74) *Attorney, Agent, or Firm* — Dinsmore & Shohl LLP

(57) ABSTRACT

A server includes a storage device that stores history information indicating a history of a state of a vehicle, and a controller that performs a process using the history information. The controller makes a first determination of whether or not a vehicle load exceeds a first load. For the vehicle for which it has been determined that the vehicle load is higher than the first load in the first determination, the controller makes a second determination of whether or not an environmental load is higher than a second load. When it is determined that the environmental load is higher than the second load in the second determination, the controller outputs an area change request requesting a change of the dispatch area of the vehicle to another dispatch area lower in the environmental load than a current dispatch area.

7 Claims, 7 Drawing Sheets

INFORMATION PROVIDING SYSTEM AND INFORMATION PROVIDING METHOD

CROSS REFERENCE TO RELATED APPLICATIONS

This nonprovisional application claims priority to Japanese Patent Application No. 2019-023163 filed on Feb. 13, 2019 with the Japan Patent Office, the entire contents of which are hereby incorporated by reference.

BACKGROUND

Field

The present disclosure relates to an information providing system of providing information about a vehicle.

Description of the Background Art

Japanese Patent Laying-Open No. 2004-14403 discloses a hybrid vehicle configured to calculate a load history of a power storage device that stores electric power to be supplied to a motor for traveling.

SUMMARY

A sharing economy service of vehicles has been receiving attention recently. The sharing economy service takes forms including car sharing in which a single vehicle is lent and borrowed among a plurality of people, ride sharing in which vehicle movement is shared among a plurality of users and the like.

Generally, a vehicle used for the sharing economy service is dispatched to and used in a predetermined area. Thus, if there is a great difference in height in roads or environmental temperature is high in a dispatch area of the vehicle, a load on components of the vehicle will increase, resulting in premature deterioration of the components of the vehicle. Such a problem and a solution to it are not described at all in Japanese Patent Laying-Open No. 2004-14403.

The present disclosure was made to solve the above-mentioned problem, and has an object to prevent premature deterioration of components of a vehicle.

(1) An information providing system according to the present disclosure is an information providing system of providing information about a vehicle, the system including: a storage device that sores history information indicating a history of a state of the vehicle; and a controller that performs a process using the history information. The controller makes a first determination of whether or not a vehicle load is higher than a first load, the vehicle load being a load on a component of the vehicle. When it is determined that the vehicle load is higher than the first load in the first determination, the controller makes a second determination of whether or not an environmental load is higher than a second load, the environmental load being a load applied to the vehicle by an environment of a dispatch area of the vehicle. When it is determined that the environmental load is higher than the second load in the second determination, the controller outputs information requesting a change of the dispatch area of the vehicle to another dispatch area lower in the environmental load than a current dispatch area.

According to the system, for the vehicle for which it has been determined that the vehicle load is higher than the first load, it is determined whether or not the environmental load on the vehicle is higher than the second load. When it is determined that the environmental load is higher than the second load, the information requesting a change of the dispatch area of the vehicle to another dispatch area lower in the environmental load than the second load is output. The dispatch area can be changed based on this information, to reduce the load applied to the vehicle by the environment of the dispatch area. As a result, premature deterioration of the component of the vehicle can be prevented.

(2) In an embodiment, when it is not determined that the environmental load is higher than the second load in the second determination, the controller makes a third determination of whether or not a driving load is higher than a third load, the driving load being a load applied to the vehicle by driving of a driver of the vehicle. When it is determined that the driving load is higher than the third load in the third determination, the controller outputs information requesting a change of the driver of the vehicle to another driver other than a current driver.

According to the embodiment, for the vehicle for which it has not been determined that the environmental load is higher than the second load, it is determined whether or not the driving load is higher than the third load. When it is determined that the driving load is higher than the third load, the information requesting a change of the driver of the vehicle to another driver other than a current driver is output. The driver of the vehicle can be changed based on this information, to reduce the load applied to the vehicle by the driving of the driver.

(3) In an embodiment, when it is determined that the driving load is higher than the third load in the third determination, the controller makes a fourth determination of whether or not there is a history of issuance of a warning that encourages reduction in the driving load to the driver of the vehicle. When it is determined that there is no history of issuance of the warning in the fourth determination, the controller performs a process for issuing the warning to the driver of the vehicle. When it is determined that there is a history of issuance of the warning in the fourth determination, the controller outputs information requesting a change of the driver of the vehicle to the another driver.

According to the embodiment, the warning is issued to the driver of the vehicle for which it has been determined that the driving load is higher than the third load. This warning can alert the driver of the vehicle to the high driving load and encourage the driver to improve the driving. Then, when the driving load is still not improved after the warning and it is again determined that the driving load is higher than the third load, information requesting a change of the driver of the vehicle to the another driver can be output.

(4) In an embodiment, the component of the vehicle includes a motor generator for traveling, a power storage device that stores electric power to be supplied to the motor generator, and a conversion circuit that performs power conversion or voltage conversion between the power storage device and the motor generator. The history information includes at least one of information indicating a history of a temperature of the conversion circuit, and information indicating a history of a temperature of the power storage device. The controller calculates the load on the component of the vehicle using at least one of variation in the temperature of the conversion circuit and variation in the temperature of the power storage device.

According to the embodiment, when the power storage device or the conversion circuit mounted on the vehicle is under a high load, the vehicle load can be reduced to prevent premature deterioration of these components.

(5) In an embodiment, the component of the vehicle includes an internal combustion engine, and a catalyst for purifying exhaust gas of the internal combustion engine. The history information includes at least one of information indicating a history of a temperature of the catalyst, and information indicating a history of a temperature of and a load on the internal combustion engine. The controller calculates the load on the component of the vehicle using at least one of the temperature of the catalyst, and the history of the temperature of and the load on the internal combustion engine.

According to the embodiment, when the internal combustion engine or the catalyst mound on the vehicle is under a high load, the vehicle load can be reduced to prevent premature deterioration of these components.

(6) In an embodiment, the history information includes at least one of information indicating a history of a travel path of the vehicle, and information indicating a history of an ambient temperature of the vehicle. The controller calculates the environmental load using at least one of a difference in height in the travel path of the vehicle, and the ambient temperature of the vehicle.

(7) In an embodiment, the history information includes at least one of information indicating a history of an amount of operation of an accelerator pedal, information indicating a history of an amount of operation of a brake pedal, and information indicating a history of a vehicle speed. The controller calculates the driving load using at least one of the amount of operation of the accelerator pedal, the amount of operation of the brake pedal, and the vehicle speed.

(8) An information providing method according to the present disclosure is a method of providing information about a vehicle, the method including: determining whether or not a vehicle load is higher than a first load using history information indicating a history of a state of the vehicle, the vehicle load being a load on a component of the vehicle; when it is determined that the vehicle load is higher than the first load, determining whether or not an environmental load is higher than a second load, the environmental load being a load applied to the vehicle by an environment of a dispatch area of the vehicle; and when it is determined that the environmental load is higher than the second load, outputting information requesting a change of the dispatch area of the vehicle to another dispatch area lower in the environmental load than a current dispatch area.

According to the method, for the vehicle for which it has been determined that the vehicle load is higher than the first load, it is determined whether or not the environmental load on the vehicle is higher than the second load. When it is determined that the environmental load is higher than the second load, the information requesting a change of the dispatch area of the vehicle to another dispatch area lower in the environmental load than the second load is output. The dispatch area can be changed based on this information, to reduce the load applied to the vehicle by the environment of the dispatch area. As a result, premature deterioration of the component of the vehicle can be prevented.

The foregoing and other objects, features, aspects and advantages of the present disclosure will become more apparent from the following detailed description of the present disclosure when taken in conjunction with the accompanying drawings.

DETAILED DESCRIPTION

Figure 1:
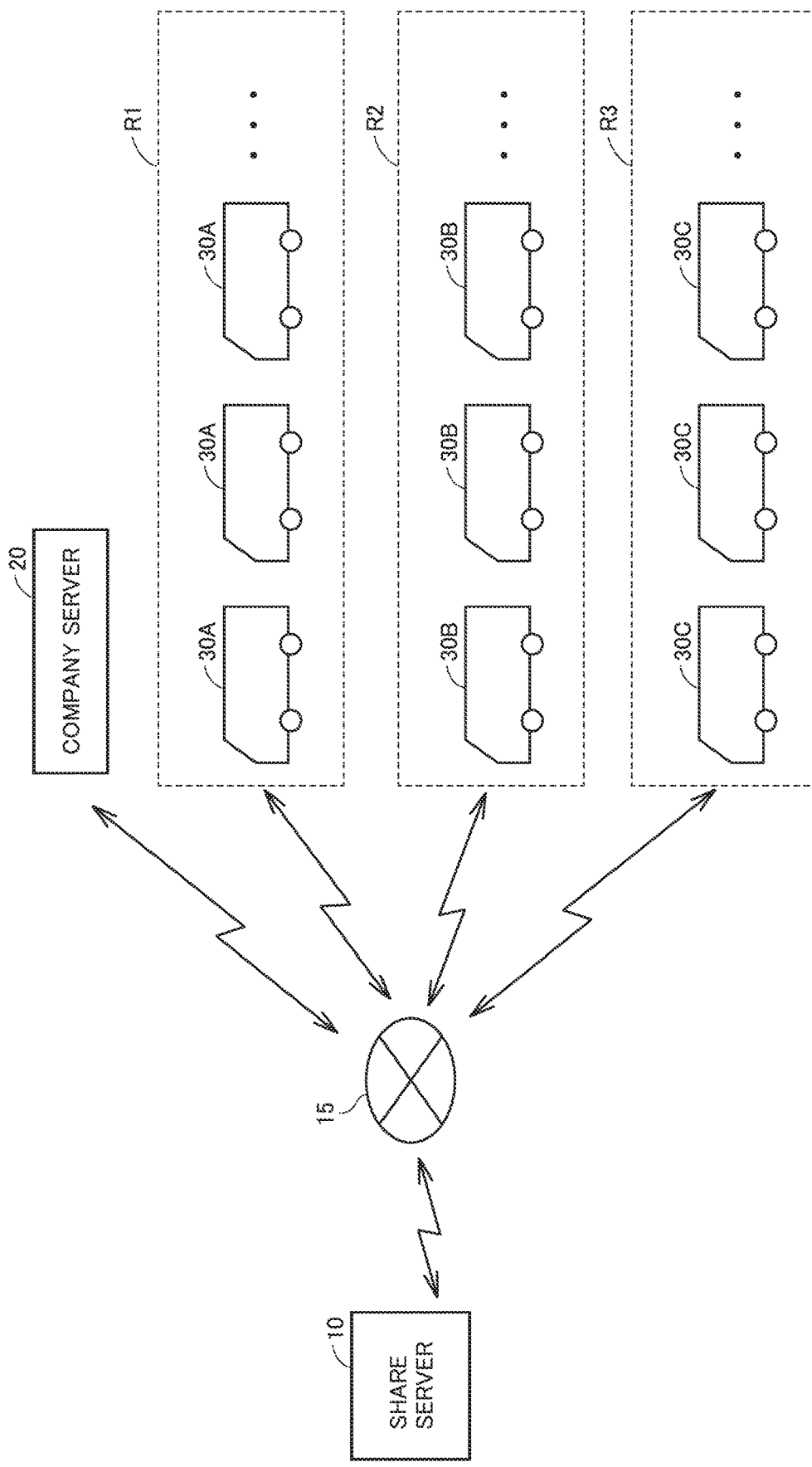
FIG. 1 schematically shows an example of an entire configuration of an information providing system.

In the following, an embodiment of the present disclosure is described in detail with reference to the accompanying drawings. The same or corresponding components are designated by the same characters in the drawings, and description thereof will not be repeated.

System Configuration

FIG. 1 schematically shows an example of an entire configuration an information providing system according to the present embodiment. This information providing system includes a share server 10, a company server 20, a plurality of vehicles 30A, a plurality of vehicles 30B, and a plurality of vehicles 30C. Share server 10, company server 20, and the plurality of vehicles 30A, 30B and 30C are configured to communicate with one another through a communication network 15. Any communication network can be employed as communication network 15. Communication network 15 may be the Internet.

Each of the plurality of vehicles 30A, 30B and 30C is used for a sharing economy service of vehicles. Vehicles 30A are dispatched to a first area R1, and mainly used within or in the vicinity of first area R1. Vehicles 30B are dispatched to a second area R2, and mainly used within or in the vicinity of second area R2. Vehicles 30C are dispatched to a third area R3, and mainly used within or in the vicinity of third area R3.

Company server 20 is operated by a company that provides a sharing economy service of vehicles 30A dispatched to first area R1, vehicles 30B dispatched to second area R2, and vehicles 30C dispatched to third area R3.

In the present embodiment, vehicles 30A, vehicles 30B and vehicles 30C are the same in basic configuration. In the following, therefore, vehicles 30A, vehicles 30B and vehicles 30C are also interchangeably referred to as "vehicle(s) 30" unless they need to be discussed separately. Although three areas R1, R2 and R3 are illustrated in FIG. 1 as the areas where vehicles 30 are dispatched, the number of areas where vehicles 30 are dispatched may be any number greater than one, such as two, or four or more.

Share server 10 is configured to provide information available for the sharing economy service to company server 20 or vehicles 30.

Figure 2:
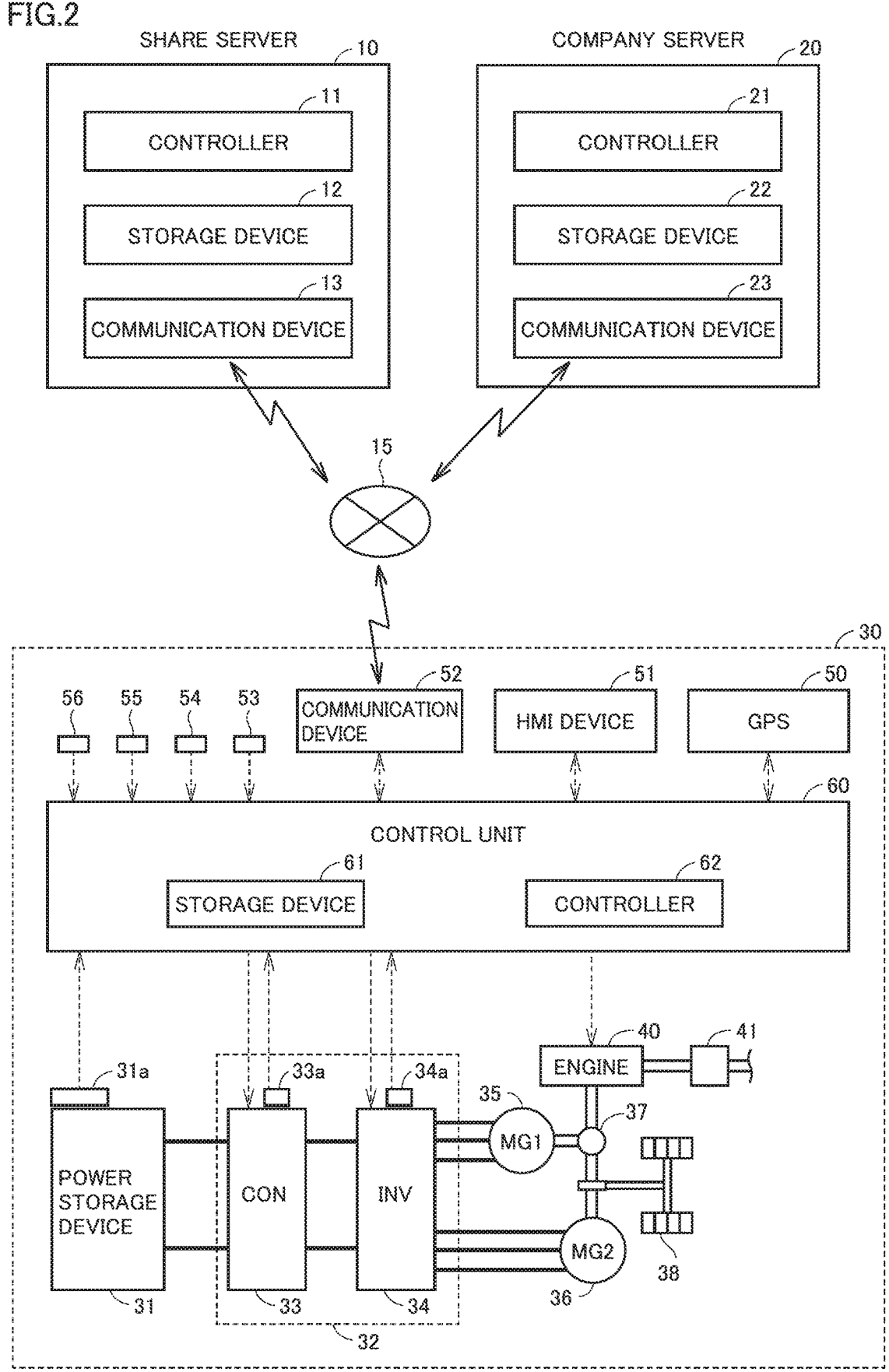
FIG. 2 schematically shows an example of configurations of a share server, a company server and each vehicle.

FIG. 2 schematically shows an example of configurations of share server 10, company server 20 and each vehicle 30. Although vehicle 30 is illustrated as a hybrid vehicle equipped with an engine and a traveling motor as a motive power source in the example of FIG. 2, the whole or part of vehicle 30 may be an electric vehicle or a fuel cell vehicle not equipped with the engine, or a conventional engine vehicle not equipped with the traveling motor.

Share server 10 includes a controller 11, a storage device 12 and a communication device 13. Communication device 13 is configured to communicate with company server 20 and vehicle 30 through communication network 15. Storage device 12 stores information received from company server 20 or vehicle 30, and the like. Controller 11 performs various types of arithmetic processing based on information received by communication device 13 and the information stored in storage device 12. Controller 11 then outputs information indicating arithmetic results to company server 20 or vehicle 30.

Company server 20 includes a controller 21, a storage device 22 and a communication device 23. Communication device 23 is configured to communicate with share server 10 and vehicle 30 through communication network 15. Storage device 22 stores information received from share server 10 or vehicle 30, and the like. Controller 21 performs various types of arithmetic processing based on information received by communication device 23 and the information stored in storage device 22. Controller 21 then outputs information indicating arithmetic results to share server 10 or vehicle 30.

Vehicle 30 includes a power storage device 31, a monitoring unit 31a, a power control unit 32, motor generators (rotating electric machines) 35 and 36, a power split device 37, driving wheels 38, an engine (internal combustion engine) 40, a catalyst 41 for purifying exhaust gas, a GPS (Global Positioning System) module 50, an HMI (Human Machine Interface) device 51, a communication device 52, an accelerator pedal sensor 53, a brake pedal sensor 54, a vehicle speed sensor 55, an outside air temperature sensor 56, and a control unit 60.

Power storage device 31 configured to include a plurality of stacked batteries. Each of the batteries is a secondary battery such as a nickel-metal hydride battery or a lithium ion battery. Power storage device 31 may be a large-capacity capacitor.

Monitoring unit 31a monitors a state (voltage, current, temperature and the like) of power storage device 31, and outputs a result thereof to control unit 60.

Power control unit 32 includes a conversion circuit including a converter 33 and an inverter 34, and also includes temperature sensors 33a and 34a. Converter 33 includes a switching element that operates to perform voltage conversion between power storage device 31 and inverter 34 in response to a command from control unit 60. Temperature sensor 33a detects a temperature of the switching element of converter 33 (hereinafter also referred to as "converter element temperature"), and outputs a result thereof to control unit 60. Inverter 34 includes a switching element that operates to perform power conversion between converter 33 and motor generators 35, 36 in response to a command from control unit 60. Temperature sensor 34a detects a temperature of the switching element of inverter 34 (hereinafter also referred to as "inverter element temperature"), and outputs a result thereof to control unit 60.

Each of motor generators 35 and 36 is an AC rotating electric machine, for example, a three-phase AC rotating electric machine including a permanent magnet embedded in a rotor (not shown). Motor generator 35 is coupled to a crankshaft of engine 40 through power split device 37. When starting engine 40, motor generator 35 rotates the crankshaft of engine 40 using electric power of power storage device 31. During travel or a stop of vehicle 30, motor generator 35 is also able to generate electric power using motive power of engine 40.

Motor generator 36 rotates, driving wheels 38 using at least one of the electric power from power storage device 31 and the electric power generated by motor generator 35. During braking or suppression of acceleration, motor generator 36 is also able to generate electric power by regenerative braking.

Engine 40 is an internal combustion engine such as a gasoline engine or a diesel engine, for example. Engine 40 is controlled by a command from control unit 60.

Power split device 37 is a planetary gear mechanism having three rotation shafts of a sun gear, a carrier and a ring gear, for example, and splits motive power generated by engine 40 into motive power to be transmitted to driving wheels 38 and motive power to be transmitted to motor generator 35.

GPS module 50 includes a receiver for use in a satellite positioning system. GPS module 50 calculates a current position of vehicle 30 based on a received signal, and outputs a result of the calculation to control unit 60. GPS module 50 may be incorporated in a navigation device including a map database.

HMI device 51 serves to provide various types of information about vehicle 30 to a user of vehicle 30, and accept operation of the user of vehicle 30. HMI device 51 includes a display, a speaker and the like provided in the vehicle interior.

Communication device 52 is configured to wirelessly communicate with share server 10 card company server 20 through communication network 15.

Communication device 52 transmits information communicated front control unit 60 to share server 10 or company server 20, or communicates information received from share server 10 or company server 20 to control unit 60.

Accelerator pedal sensor 53 detects an amount of operation of an accelerator pedal by a drivel of vehicle 30, and outputs a result thereof to control unit 60. Brake pedal sensor 54 detects an amount of operation of a brake pedal by the driver of vehicle 30, and outputs a result thereof to control unit 60. Vehicle speed sensor 55 detects a vehicle speed, and or a result thereof to control alter 60. Outside an temperature sensor 56 detects an outside air temperature around vehicle 30, and outputs a result thereof to control unit 60.

Control unit 60 includes input and output ports (not shown) through which various signals are input and output, a storage device 61 storing various types of information, and a controller 62. Controller 62 performs prescribed arithmetic processing based on the information from each sensor and the information stored in storage device 61, and controls each device of vehicle 30 based on an arithmetic result. It should be noted that the control performed by controller 62 is not limited to processing using software, and dedicated hardware (electronic circuitry) may be constructed for processing the control.

Controller 62 stores and accumulates the information from each sensor and the information calculated through the arithmetic processing as information indicating a history of a state of vehicle 30 (hereinafter also referred to simply as "history information") in storage device 61. The history information stored in storage device 61 includes a history of a temperature of power storage device 31, a history of the converter element temperature, a history of the inverter element temperature, a history of a vehicle position, a history of the amount of operation of the accelerator pedal, a history of the amount of operation of the brake pedal, a history of the vehicle speed, a history of the outside air temperature around vehicle 30, and the like.

Then, controller 62 transmits the history information stored in storage device 61 to share server 10 and company server 20 at regular intervals or in response to an external request.

Share server 10 stores the history information received from vehicle 30 in storage device 12. Company server 20 stores the history in received from vehicle 30 in storage device 22.

Dispatch Area of Vehicle and Change of Driver

Vehicles 30 are used for a sharing economy service as described above. Each of vehicles 30 is dispatched to one of first area R1, second area R2 and third area R3, and driven by an assigned driver in the dispatch area. On this occasion, if there is a great difference in height in roads or environmental temperature is high in the dispatch area of vehicle 30, a load on a component of vehicle 30 will increase, resulting in premature deterioration of the component of vehicle 30. Alternatively, if the driver of vehicle 30 tends to suddenly accelerate and decelerate the vehicle, a load on a component of vehicle 30 will increase, resulting in premature deterioration of the component of vehicle 30.

The controller 11 of share server 10 according to the present embodiment calculates a load on a component of each vehicle 30 (hereinafter also referred to simply as "vehicle load") using the history information about each vehicle 30, and determines whether or not the calculated vehicle load exceeds a first load L1 (first determination).

Then, for vehicle 30 for which it has been determined that the vehicle load is higher than first load L1 in the first determination, controller 11 of share server 10 performs a process for determining whether or not the high vehicle load has been caused by the environment of the dispatch area of vehicle 30. Specifically, controller 11 of share server 10 calculates a load applied to vehicle 30 by the environment of the dispatch area of vehicle 30 (hereinafter also referred to as "environmental load") using the history information about that vehicle 30, and determines whether or not the environmental load is higher than a second load L2 (second determination).

Further, when it is not determined that the environmental load is higher than second load L2 in the second determination, controller 11 of share server 10 according to the present embodiment performs a process for determining whether or not the high vehicle load has been caused by driving of the driver of vehicle 30. Specifically, controller 11 of share server 10 calculates a load applied to vehicle 30 by the driving of the driver of vehicle 30 (hereinafter also referred to as "driving load") using the history information about that vehicle 30, and determines whether or not the calculated driving load is higher than a third load L3 (third determination).

It should be noted that the history information about vehicle 30 used in the first determination, the second determination and the third determination described above may be any of the history information stored in storage device 12 of share server 10, the history information stored in storage device 22 of company server 20, and the history information stored in storage device 61 of each vehicle 30.

For vehicle 30 for which it has been determined that the environmental load is higher than second load L2 in the second determination, it is assumed that the high vehicle load has been caused by the environment of the dispatch area of vehicle 30. Thus, controller 11 of share server 10 outputs information requesting a change of the dispatch area of that vehicle 30 to another dispatch area lower in the environmental load than the current dispatch area (hereinafter also referred to as "area change request") to company server 20. The company operating company server 20 can change the dispatch area of that vehicle 30 in response to this area change request, to reduce the load applied to that vehicle 30 by the dispatch area (environment) of that vehicle 30.

For vehicle 30 for which it has been determined that the driving load is higher than third load L3 in the third determination, it is assumed that the high vehicle load has been caused by driving of the driver of vehicle 30. Thus, controller 11 of share server 10 outputs in requesting a change of the driver of vehicle 30 to another driver other than the current driver (hereinafter also referred to as "driver change request") to company server 20. The company operating company server 20 can change the driver assigned to that vehicle 30 in response to this driver change request, to reduce the load applied to that vehicle 30 by the driving of the driver assigned to that vehicle 30.

Figure 3:
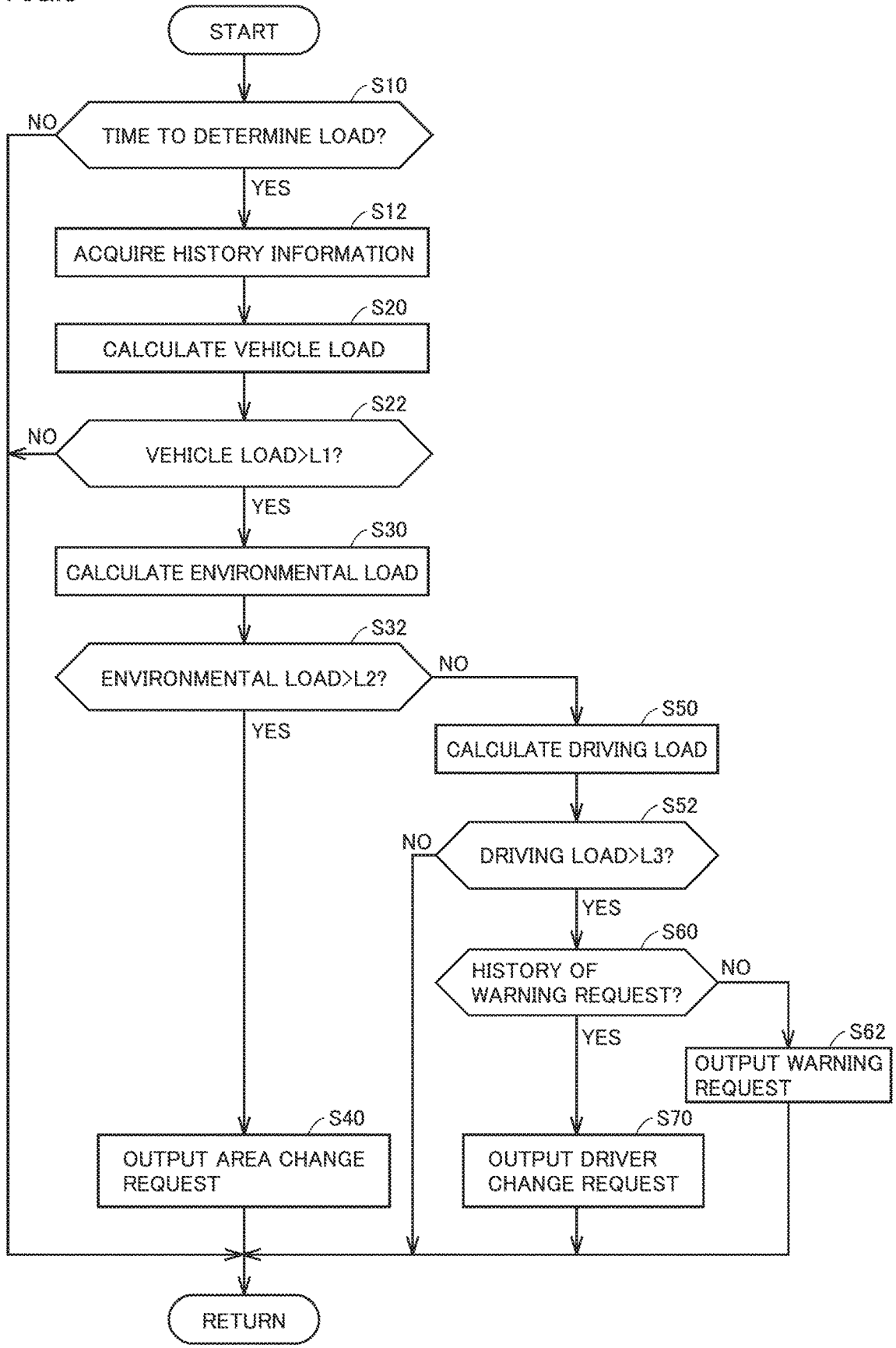
FIG. 3 is a first flowchart showing an example of an overview of a process performed by a controller of the share server.

FIG. 3 is a flowchart showing an example of an overview of the process performed by controller 11 of share server 10. This flowchart is repeatedly executed for each vehicle 30 each time a predetermined condition is satisfied (for example, at regular intervals).

Controller 11 determines whether or not it is time to determine the vehicle load (step S10). When the current date and time are predetermined date and time of determination, for example controller 11 determines that it is time to determine the vehicle load. When it is not time to determine the vehicle load (NO in step S10), controller 11 skips the subsequent process and moves the process to RETURN.

When it is time to determine the vehicle load (YES in step S10), controller 11 acquires the history information about vehicle 30 from storage device 12 of share server 10 (step S12). As described above, the source of the history information is not limited to storage device 12 of share server 10, but may be storage device 22 of company server 20, or storage device 61 of vehicle 30. In other words, storage device 12 of share server 10, storage device 22 of company server 20, and storage device 61 of vehicle 30 may each correspond to the "storage device" according to the present disclosure.

Next, controller 11 calculates the above-mentioned vehicle Toad the load on a component of vehicle 30) based on the history information acquired in step S12 (step S20). Various methods can be employed for the calculation of the vehicle load depending on which component of vehicle 30 the load is calculated for. For example, when calculating a load on converter 33, a frequency at which or a time during, which variation in the converter element temperature exceeds a prescribed amount can be calculated as the vehicle load based on the history information about the converter element temperature. When calculating a load on inverter 34, a frequency at which or a time during which variation in the inverter element temperature exceeds a prescribed amount can be calculated as the vehicle load based on the history information about the inverter element temperature. When calculating a load on power storage device 31, frequency at which or a time during which the temperature of power storage device 31 exceeds a prescribed temperature can be calculated as the vehicle load based on the history information about the temperature of power storage device 31. When calculating a load on engine 40, a load applied to engine 40 when engine 40 has not been warmed up can be calculated as the vehicle load. When calculating a load on catalyst 41, a frequency at which or a time during which the temperature of catalyst 41 exceeds a prescribed temperature can be calculated as the vehicle load. The temperature of catalyst 41 can be estimated from, for example, a driving history of engine 40 and the like.

After calculating the vehicle load, controller 11 makes the first determination of whether or not the calculated vehicle load is higher than first load L1 (step S22). When it is not determined that the vehicle load is higher than first load L1 (NO in step S22), controller 11 skips the subsequent process and moves the process to RETURN.

When it is determined that the vehicle load is higher than first load L1 (YES in step S22), controller 11 calculates the above-mentioned environmental load (the load applied to vehicle 30 by the environment of the dispatch area of vehicle 30) based on the history information acquired in step S22 (step S30). For example, when calculating an environmental load caused by a terrain of the dispatch area, controller 11 can calculate, from the history of the vehicle position, a frequency at which a difference in height in the road on which vehicle 30 has traveled exceeds a prescribed amount as the environmental load. When calculating an environmental load caused by the temperature of the dispatch area, controller 11 can calculate, from the history of the outside air temperature around vehicle 30, a frequency at which or a time during which the outside air temperature around vehicle 30 exceeds a prescribed temperature as the environmental load.

After calculating the environmental load, controller 11 makes the second determination of whether or not the calculated environmental load is higher than second load L2 (step S32). When it is determined that the environmental load is higher than second load L2 (YES in step S32), it is assumed that the high vehicle load has been caused by the environment of the dispatch area of vehicle 30. Thus, controller 11 outputs the above-mentioned area change request (the information requesting a change of the dispatch area to another dispatch area lower in the environmental load than the current dispatch area) to company server 20 (step S40). For example, when the current dispatch area is first area R1, and it can be determined from the history information from vehicles 30A and vehicles 30B that the environmental load of second area R2 is lower than the environmental load of first area R1, then controller 11 outputs information requesting a change of the dispatch area from current first area R1 to second area R2 as the area change request to company server 20.

When it is not determined that the environmental load is higher than second load L2 (NO in step S32), on the other hand, controller 11 calculates the above-mentioned driving load (the load applied to vehicle 30 by the driving of the driver) based on the history information acquired in step S12 (step S50). For example, when calculating a driving load caused by acceleration, controller 11 can calculate, from the history of the amount of operation of the accelerator pedal, a frequency at which an amount of increase per unit time in the amount of operation of the accelerator pedal exceeds a prescribed amount as the driving load. When calculating a driving load caused by deceleration, controller 11 can calculate, from the history of the amount of operation of the brake pedal, a frequency at which an amount of increase per unit time in the amount of operation of the brake pedal exceeds a prescribed amount as the driving load. When calculating a driving load caused by a high vehicle speed, controller 11 can calculate a frequency at which or a time during which the vehicle speed exceeds a prescribed speed as the driving load.

After calculating the driving load, controller 11 makes the third determination of whether or not the calculated driving load is higher than third load L3 (step S52). When it is not determined that the driving load is higher than third load L3 (NO in step S52), controller 11 skips the subsequent process and moves the process to RETURN. When it is determined that the driving load is higher than third load L3 (YES in step S52), controller 11 makes a fourth determination of whether or not there is a history of output of a warning request to vehicle 30 (step S60). The warning request is information requesting issuance of a warning that encourages reduction in the driving load to the driver of vehicle 30 by the HMI device Si of vehicle 30.

When there is no history of output of the warning request to vehicle 30 (NO in step S60), controller 11 outputs the warning request to vehicle 30 (step S62). For example, controller 11 requests vehicle 30 to display a message that encourages reduction in the driving load on HMI device 51 of vehicle 30. In response to this warning request, controller 62 of vehicle 30 can cause HMI device 51 to display the message that encourages reduction in the driving load, to alert the driver of vehicle 30 to the high driving load and encourage the driver to improve the driving.

When there is a history of output of the warning request to vehicle 30 (YES in step S60), it is assumed that the current driver cannot be relied upon to improve the driving. Thus, controller 11 outputs the above-mentioned driver change request (the information requesting a change of the driver of vehicle 30 to another driver other than the current driver) to company server 20 (step S70).

It should be noted that the "another driver" may or may not be designated in the driver change request. If the "another driver" is designated in the driver change request, a driver working in the same dispatch area as the current driver or a driver working in a different dispatch area than the current driver may be designated as the "another driver." If share server 10 can know the driving loads by the drivers of all vehicles 30, a driver with a lower driving load than that, of the current driver may be extracted, and tire extracted driver may be designated as the "another driver." If the "another driver" is not designated in the driver change request, the "another driver" may be designated by company server 20 that has received the driver change request.

As described above, controller 11 of share server 10 according to the present embodiment makes the first determination of whether or not the vehicle load exceeds first load L1. For vehicle 30 for which it has been determined that the vehicle load is higher than first load L1 in the first determination, controller 11 of share server 10 makes the second determination of whether or not the environmental load is higher than second load L2.

When it is determined that the environmental load is higher than second load L2 in the second determination, controller 11 of share server 10 outputs the area change request to company server 20. The company operating company server 20 can change the dispatch area of that vehicle 30 in response to this area change request, to reduce the load applied to that vehicle 30 by the environment of the dispatch area of that vehicle 30. As a result, premature deterioration of the component of vehicle 30 used for a sharing economy service due to the environment of the dispatch area can be prevented.

Further, when it is not determined that the environmental load is higher than second load L2 in the second determination, controller 11 of share server 10 makes the third determination of whether or not the driving load is higher than third load L3.

When it is determined that the driving load is higher than third load L3 in the third determination, controller 11 of share server 10 outputs the driver change request to company server 20. The company operating company server 20 can change the driver assigned to that vehicle 30 in response to this driver change request, to reduce the driving load on that vehicle 30. As a result, premature deterioration of the component of vehicle 30 due to the driving of the driver can be prevented.

Further, when it is determined that the driving load is higher than third load L3 in the third determination, controller 11 of share server 10 according to the present embodiment first outputs the warning request to vehicle 30, instead of immediately out the driver change request to company server 20. In response to this warning request, the message that encourages the driver of vehicle 30 to reduce the driving load can be displayed on HMI device 51 of vehicle 30, to alert the driver of vehicle 30 to the high driving load and encourage the driver to improve the driving. Accordingly, the driving load on vehicle 30 can be expected to be reduced without a change of the driver of that vehicle 30.

First Modification

In the example described in the above-mentioned embodiment, when it is determined that the driving load is higher than third load L3 in the third determination, the warning request is output to vehicle 30 to display the warning message on HMI device 51 of vehicle 30, before the driver change request is output. However, the example may be modified to omit the process of outputting the warning request to vehicle 30 before outputting the driver change request.

Figure 4:
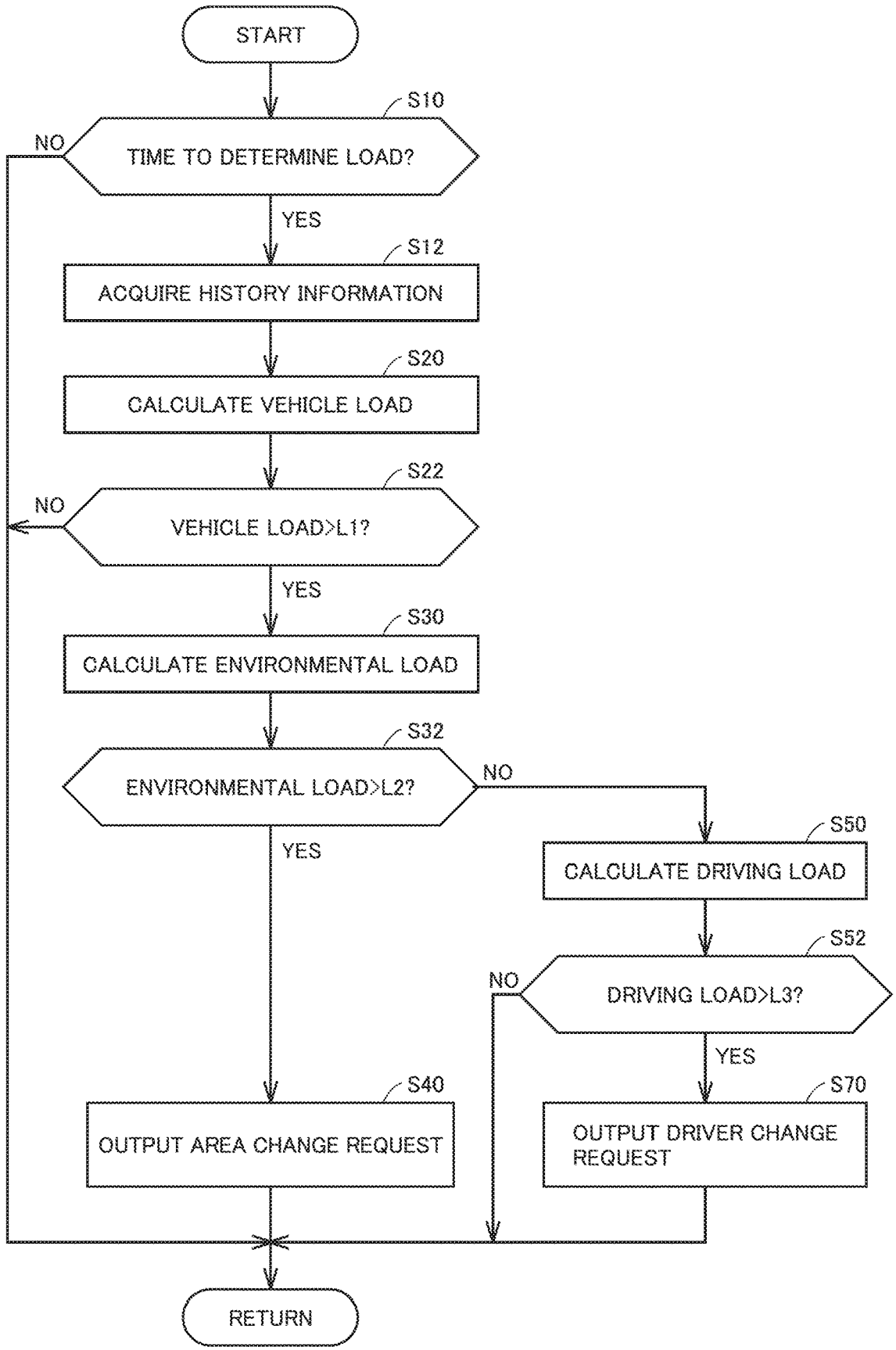
FIG. 4 is a second flowchart showing an example of an overview of a process performed by the controller of the share server.

FIG. 4 is a flowchart showing an example of an overview of a process performed by controller 11 of share server 10 according to a first modification. This flowchart is the same as the above-mentioned flowchart of FIG. 3 except that the process of steps S60 and S62 has been removed. As the remaining steps (steps designated by the same numbers as the above-mentioned steps shown in FIG. 3) have already been described, detailed description thereof will not be repeated.

Also in the process according to the first modification, premature deterioration of the component of vehicle 30 used for a sharing economy service due to the environment of the dispatch area or the driving of the driver can be prevented. The process according to the first modification does not issue the warning request using. HMI device 51, and is thus also applicable to a vehicle not including HMI device 51.

Second Modification

In the example described in the above-mentioned embodiment, when it is not determined that the environmental load is higher than second load L2 in the second determination, the third determination of whether or not the driving load is higher than third load L3 is made. However, the example may be modified to omit the third determination and the subsequent process.

Figure 5:
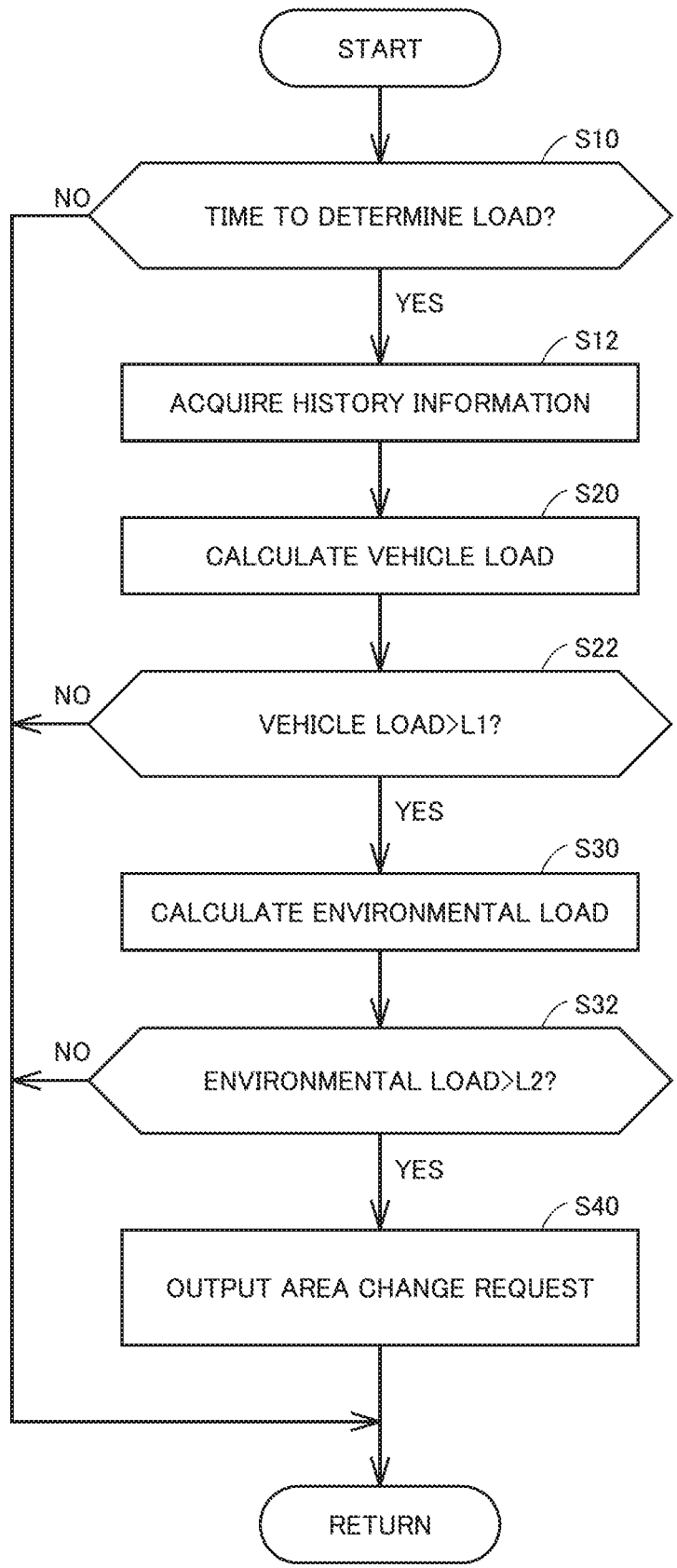
FIG. 5 is a third flowchart showing an example of an overview of a process performed by the controller of the share server.

FIG. 5 is a flowchart showing an example of an overview of a process performed by controller 11 of share server 10 according to a second modification. This flowchart is the same as the above-mentioned flowchart of FIG. 3 except that the process of steps S50, S52, S60, S62 and S70 has been removed. As the remaining stops (steps designated by the same numbers as the above-mentioned steps shown in FIG. 3) have already been described, detailed description thereof will not be repeated.

Also in the process according to the second modification, premature deterioration of the component of vehicle 30 used for a sharing economy service due to the environment of the dispatch area can be prevented. The process according to the second modification does not calculate the driving load caused by the driving of the driver, and is thus also applicable to an automated-driving vehicle not driven by a driver.

Third Modification

In the example described in the above-mentioned embodiment, when it is determined that the vehicle load is higher than first load L1 in the first determination, the second determination of whether or not the environmental load is higher than second load L2 is made preferentially over the third determination of whether or not the driving load is higher than third load L3. However, the example ma be modified to make the third determination preferentially over the second determination.

Figure 6:
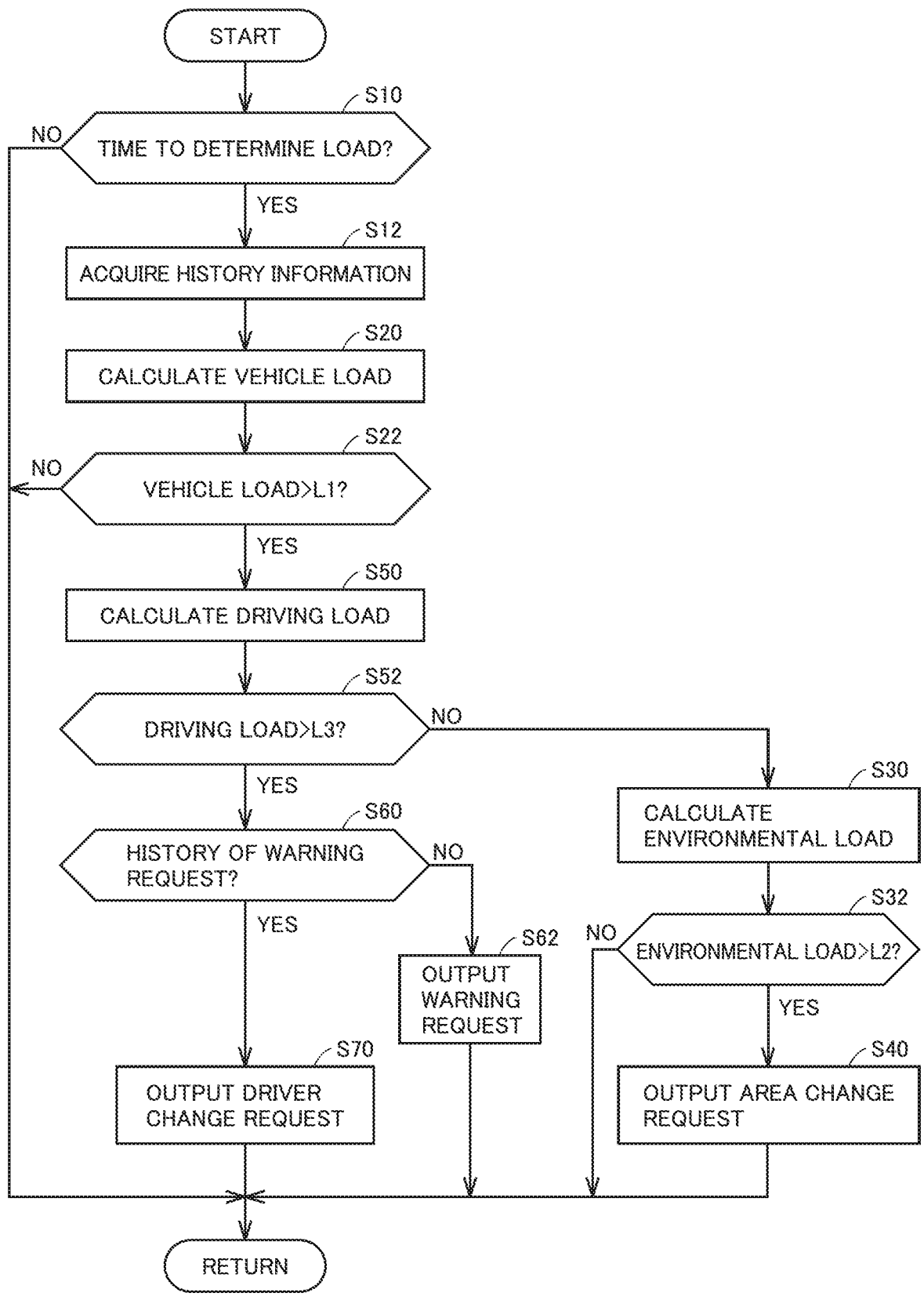
FIG. 6 is a fourth flowchart showing an example of an overview of a process performed by the controller of the share server.

FIG. 6 is a flowchart showing an example of an overview of a process performer by controller 11 of share server 10 according to a third modification. This flowchart is the same as the above-mentioned flowchart of FIG. 3 except that the process sequence after step S30 has been changed. As the processing details themselves of each step have already been described, detailed description thereof will not be repeated.

When it is determined that the vehicle load is higher than first load L1 (YES in step S22), controller 11 calculates the driving load (step S50), and makes the third determination of whether or not the calculated driving load is higher than third load L3 (step S52).

When it is determined that the driving load is higher than third load L3 in the third determination (YES in step S52), controller 11 makes the fourth determination of whether or not there, is a history of output of the warning request to vehicle 30 (step S60). When there is no history of output of the warning request to vehicle 30 (NO in step S60), controller 11 outputs the warning request to vehicle 30 (step S62). When there is a history of output of the warning request to vehicle 30 (YES in step S60), controller 11 outputs the above-mentioned driver change request to company server 20 (step S70).

When it is not determined that the driving load is higher than third load L3 in the third determination (NO in step S52), on the other hand, controller 11 calculates the environmental load (step S30), and makes the second determination of whether or not the calculated environmental load is higher than second load L1 (step S32). When it is determined that the environmental load is higher than second load L2 in the second determination (YES in step S32), controller 11 outputs the above-mentioned area change request to company server 20 (step S40).

Also in the process according to the third modification, premature deterioration of the component of vehicle 30 used for a sharing economy service can be prevented.

It should be noted that the process of steps S60 and S62 may be removed from the flowchart of FIG. 6 according to the third modification, as in the first modification.

Fourth Modification

In the example described in the above-mentioned third modification, when it is not determined that the driving load is higher than third load L3 in the third determination, the second determination of whether or not the environmental load is higher than second load L2 is made. However, the example may be modified to omit the second determination and the subsequent process.

Figure 7:
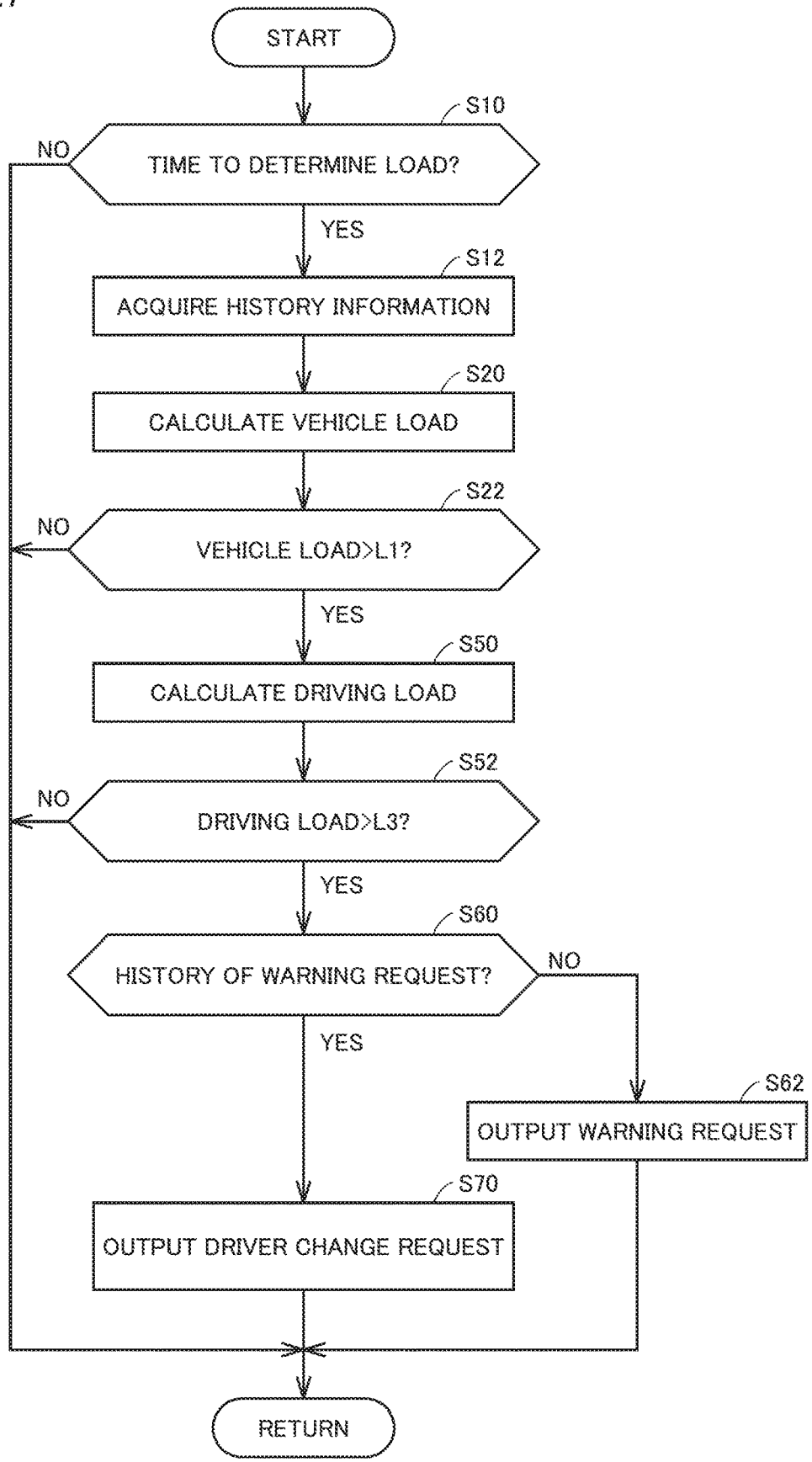
FIG. 7 is a fifth flowchart showing an example of an overview of a process performed by the controller of the share server.

FIG. 7 is a flowchart showing an example of an overview of a process performed by controller 11 of share server 10 according to a fourth modification. This flowchart is the same as the above-mentioned flowchart of FIG. 6 except that the process of steps S30, S32 and S40 has been removed.

Also in the process according to the fourth modification, premature deterioration of the component of vehicle 30 used for a sharing economy service due to the driving of the driver can be prevented.

Fifth Modification

In the examples described in the above-mentioned embodiment and its first to fourth modifications, the processes shown in the flowcharts of FIGS. 3 to 7 are executed by controller 11 of share server 10. However, the processes shown in the flowcharts of FIGS. 3 to 7 are not limited to be executed by controller 11 of share server 10, but may be executed, for example, by controller 21 of company server 20, or controller 62 of vehicle 30. In other words, controller 11 of share server 10, controller 21 of company server 20, and controller 62 of vehicle 30 may each correspond to the "controller" according to the present disclosure.

The above-mentioned embodiment and its first to fifth modifications can also be combined as appropriate within the range where technical inconsistency does not occur.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information providing system of providing information about a vehicle, the system comprising:
    a storage device that stores history information indicating a history of a state of the vehicle; and
    a controller that performs a process using the history information, wherein
    the controller makes a first determination of whether or not a vehicle load is greater than a first load, the vehicle load being a load on a component of the vehicle,
    when it is determined that the vehicle load is greater than the first load in the first determination, the controller makes a second determination of whether or not an environmental load is greater than a second load, the environmental load being a load applied to the vehicle by an environment of a dispatch area of the vehicle,
    when it is determined that the environmental load is greater than the second load in the second determination, the controller outputs information requesting a change of the dispatch area of the vehicle to another dispatch area lower in the environmental load than a current dispatch area,
    when it is not determined that the environmental load is greater than the second load in the second determination, the controller makes a third determination of whether or not a driving load is greater than a third load, the driving load being applied to the vehicle by driving of a driver of the vehicle,
    when it is determined that the driving load is greater than the third load in the third determination, the controller outputs information requesting a change of the driver of the vehicle to another driver other than a current driver, and the controller makes a fourth determination of whether or not there is a history of issuance of a warning that encourages reduction in the driving load to the driver of the vehicle,
    when it is determined that there is no history of issuance of the warning in the fourth determination, the controller performs a process for issuing the warning to the driver of the vehicle, and
    when it is determined that there is a history of issuance of the warning in the fourth determination, the controller outputs information requesting a change of the driver of the vehicle to the another driver.

2. The information providing system according to claim 1, wherein
    the component of the vehicle includes a motor generator for traveling, a power storage device that stores electric power to be supplied to the motor generator, and a conversion circuit that performs power conversion or voltage conversion between the power storage device and the motor generator,
    the history information includes at least one of information indicating a history of a temperature of the conversion circuit, and information indicating a history of a temperature of the power storage device, and
    the controller calculates the load on the component of the vehicle using at least one of variation in the temperature of the conversion circuit and variation in the temperature of the power storage device.

3. The information providing system according to claim 1, wherein
    the component of the vehicle includes an internal combustion engine, and a catalyst for purifying exhaust gas of the internal combustion engine,
    the history information includes at least one of information indicating a history of a temperature of the catalyst, and information indicating a history of a temperature of and a load on the internal combustion engine, and
    the controller calculates the load on the component of the vehicle using at least one of the temperature of the catalyst, and the history of the temperature of and the load on the internal combustion engine.

4. The information providing system according to claim 1, wherein
    the history information includes at least one of information indicating a history of a travel path of the vehicle, and information indicating a history of an ambient temperature of the vehicle, and
    the controller calculates the environmental load using at least one of a difference in height in the travel path of the vehicle, and the ambient temperature of the vehicle.

5. The information providing system according to claim 1, wherein
    the history information includes at least one of information indicating a history of an amount of operation of an accelerator pedal, information indicating a history of an amount of operation of a brake pedal, and information indicating a history of a vehicle speed, and
    the controller calculates the driving load using at least one of the amount of operation of the accelerator pedal, the amount of operation of the brake pedal, and the vehicle speed.

6. A method of providing information about a vehicle, the method comprising:
    determining whether or not a vehicle load is greater than a first load using history information indicating a history of a state of the vehicle, the vehicle load being a load on a component of the vehicle;

when it is determined that the vehicle load is greater than the first load, determining whether or not an environmental load is greater than a second load, the environmental load being a load applied to the vehicle by an environment of a dispatch area of the vehicle;

when it is determined that the environmental load is greater than the second load, outputting information requesting a change of the dispatch area of the vehicle to another dispatch area lower in the environmental load than a current dispatch area, when it is not determined that the environmental load is greater than the second load, determining whether or not a driving load is greater than a third load, the driving load being applied to the vehicle by driving of a driver of the vehicle, when it is determined that the driving load is greater than the third load, outputting information requesting a change of the driver of the vehicle to another driver other than a current driver, and determining whether or not there is a history of issuance of a warning that encourages reduction in the driving load to the driver of the vehicle, when it is determined that there is no history of issuance of the warning, performing a process for issuing the warning to the driver of the vehicle, and when it is determined that there is a history of issuance of the warning, outputting information requesting a change of the driver of the vehicle to the another driver.

7. An information providing system of providing information about a vehicle, the system comprising:

a storage device that stores history information indicating a history of a state of the vehicle, the history information includes at least one of information indicating a history of an amount of operation of an accelerator pedal, information indicating a history of an amount of operation of a brake pedal, and information indicating a history of a vehicle speed; and a controller that performs a process using the history information, wherein the controller calculates a driving load using at least one of the amount of operation of the accelerator pedal, the amount of operation of the brake pedal, and the vehicle speed, the driving load being a load applied to the vehicle by driving of a driver of the vehicle, the controller makes a first determination of whether or not a vehicle load is greater than a first load, the vehicle load being a load on a component of the vehicle, when it is determined that the vehicle load is greater than the first load in the first determination, the controller makes a second determination of whether or not an environmental load is greater than a second load, the environmental load being a load applied to the vehicle by an environment of a dispatch area of the vehicle, when it is determined that the environmental load is greater than the second load in the second determination, the controller outputs information requesting a change of the dispatch area of the vehicle to another dispatch area lower in the environmental load than a current dispatch area, when it is not determined that the environmental load is greater than the second load in the second determination, the controller makes a third determination of whether or not the driving load is greater than a third load, and when it is determined that the driving load is greater than the third load in the third determination, the controller outputs information requesting a change of the driver of the vehicle to another driver other than a current driver.

* * * * *